Aug. 7, 1956
W. F. RICHARDSON
2,757,734
TRAVELING CUT-OFF MACHINE
Filed May 11, 1953
4 Sheets-Sheet 1
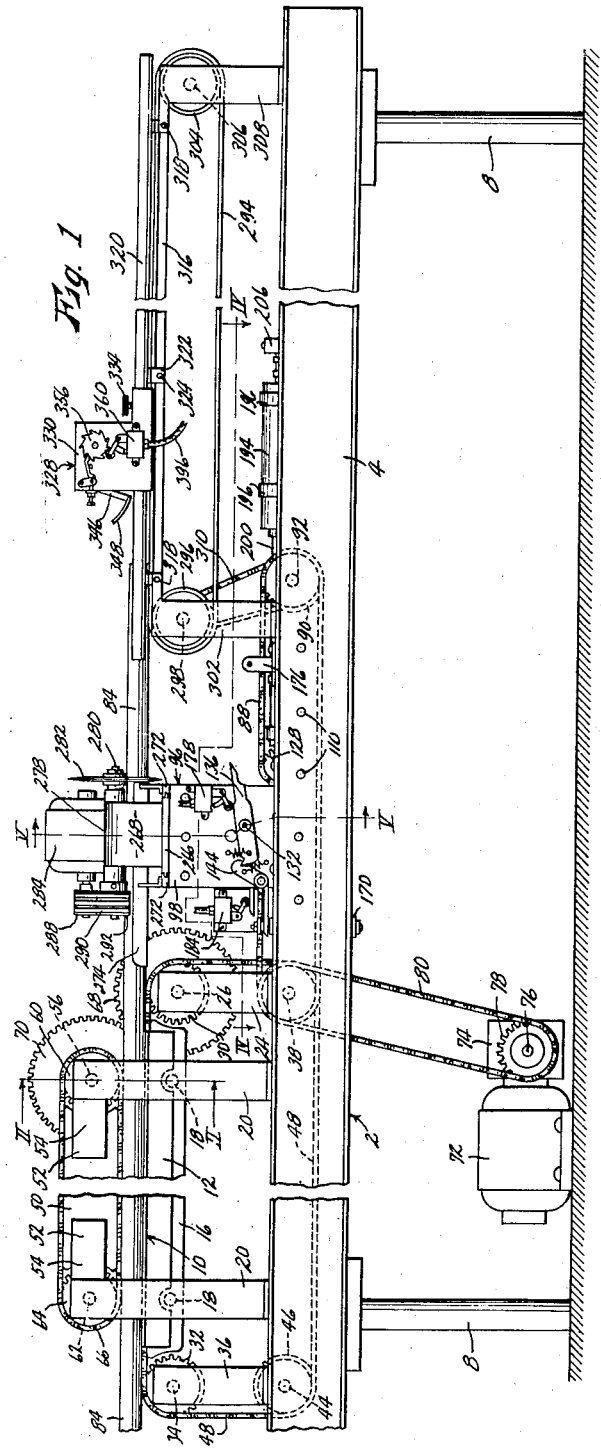
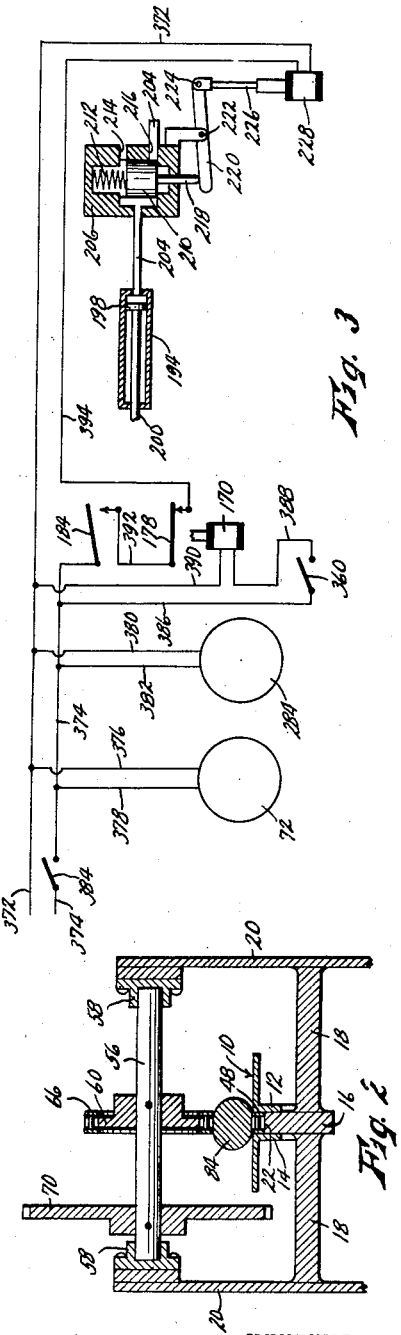
INVENTOR.
William F. Richardson
BY
Hamilton + Hamilton
Attorneys.

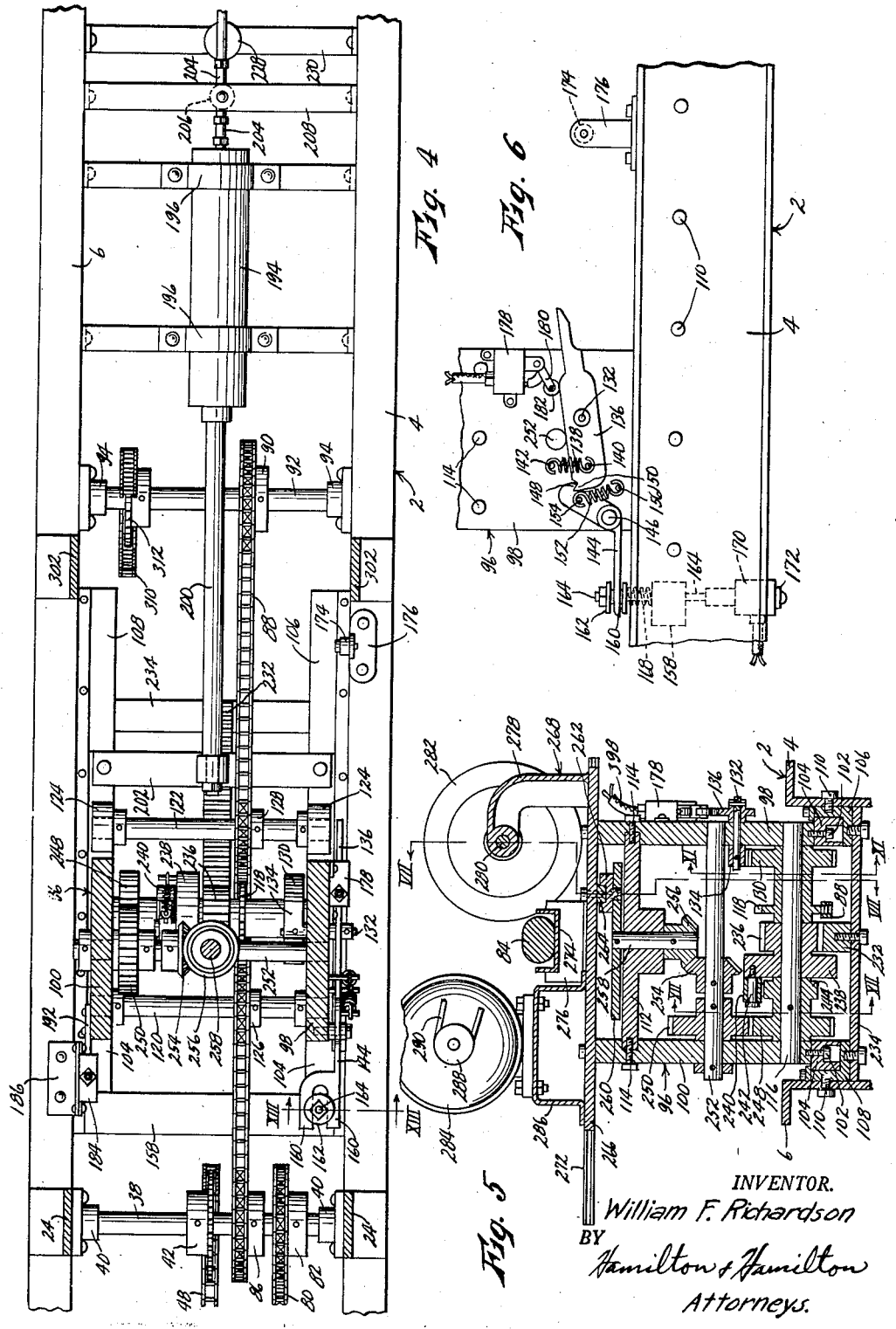

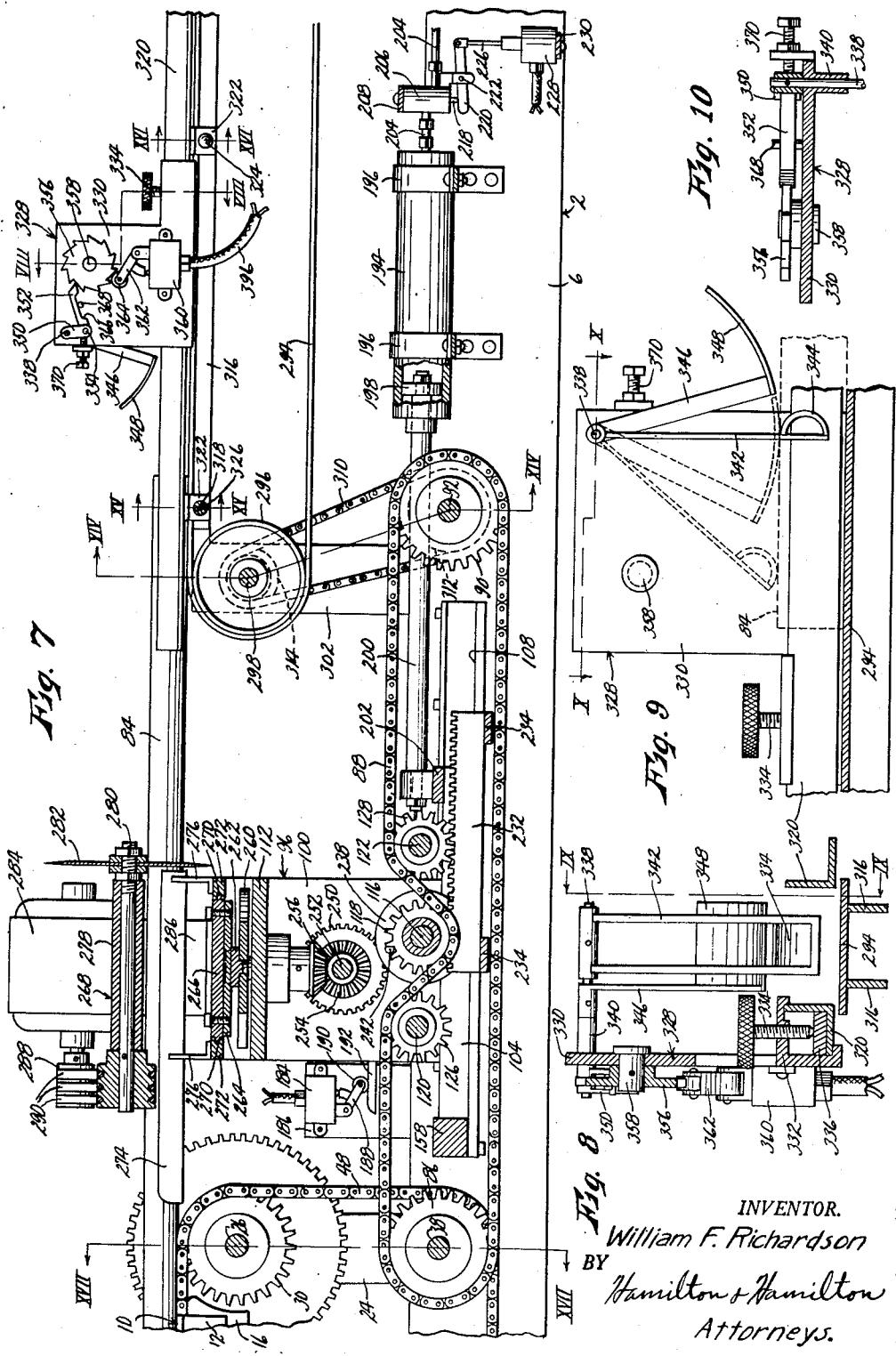

Aug. 7, 1956

W. F. RICHARDSON 2,757,734

TRAVELING CUT-OFF MACHINE

Filed May 11, 1953

INVENTOR.
William F. Richardson
BY
Hamilton & Hamilton
Attorneys.

United States Patent Office

2,757,734
Patented Aug. 7, 1956

2,757,734

TRAVELING CUT-OFF MACHINE

William F. Richardson, Carthage, Mo., assignor to Flex-O-Lators, Inc., Carthage, Mo., a corporation of Missouri Application May 11, 1953, Serial No. 354,276

6 Claims. (Cl. 164—61)

This invention relates to new and useful improvements in cut-off machines, and has particular reference to cut-off machines of the "traveling" or "walking" type.

The principal object of the present invention is the provision of a cut-off machine adapted to sever a continuous, rod-like member into lengths as said member travels at a uniform speed in a direction longitudinal to itself. This operation desirably may be performed as a final step in the process of manufacturing the rod-like member, as said member is ejected from a forming machine, and it is quite advantageous to be enabled to perform the cut-off operation without interrupting the travel of the member. A particular material on which the device is at present used is a composite paper roll used for padding in upholstery construction, but it will be readily apparent that the invention is not so limited.

Another object is the provision of a cut-off machine of the character described having novel means synchronizing the speed of travel of the cutting member with the speed of the member being severed, whereby said synchronization is closely maintained even if, for any reason, the speed of said member should vary.

A further object is the provision, in a cut-off machine of the character described, of novel means whereby the the machine is adjustable to sever the rod-like member into sections of any desired length with great accuracy.

Other objects are simplicity and economy of construction, efficiency and dependability of operation, and adaptability for use in a wide variety of applications in cutting many different materials.

With these objects in view, as well as other objects which will appear in the course of the specification, reference will be had to the drawing, wherein:

Fig. 1 is a side elevational view, partially broken away and foreshortened, of a traveling cut-off machine embodying the present invention.

Fig. 2 is an enlarged fragmentary sectional view taken on line II—II of Fig. 1.

Fig. 3 is a diagrammatic representation of the electrical and air pressure system used in the machine.

Fig. 4 is an enlarged fragmentary sectional view taken on line IV—IV of Fig. 1.

Fig. 5 is an enlarged fragmentary sectional view taken on line V—V of Fig. 1.

Fig. 6 is an enlarged fragmentary side elevational view of the machine as viewed in Fig. 1, with parts omitted, showing details of the carriage tripping mechanism.

Fig. 7 is a fragmentary sectional view taken on line VII—VII of Fig. 5, with parts broken away.

Fig. 8 is an enlarged sectional view taken on line VIII—VIII of Fig. 7.

Fig. 9 is a fragmentary sectional view taken on line IX—IX of Fig. 8, showing the parts at rest in solid lines, and in the position assumed when actuated by the rod-like member being severed in dotted lines.

Fig. 10 is a fragmentary sectional view taken on line X—X of Fig. 9.

Figure 11:
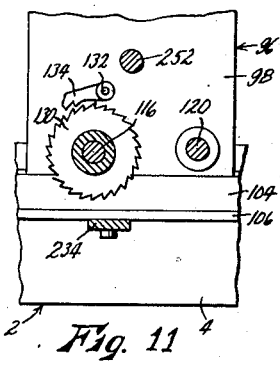
Fig. 11 is a fragmentary sectional view taken on line XI—XI of Fig. 5.
Figure 12:
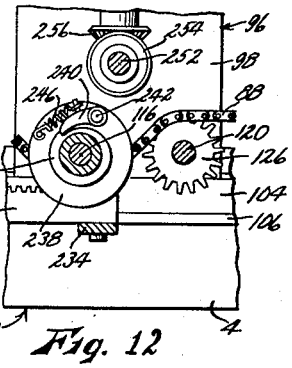
Fig. 12 is a fragmentary sectional view taken on line XII—XII of Fig. 5.

Like reference numerals apply to similar parts throughout the several views, and the numeral 2 applies generally to a frame comprising a pair of horizontal, parallel, spaced apart channels 4 and 6, said channels opening outwardly, and said frame being supported by suitable ground engaging legs 8, as shown in Fig. 1.

At the left end portion of the frame, as viewed in Fig. 1, a table 10 is supported rigidly above said frame, extending longitudinally of said frame. Said table is formed by the oppositely extending horizontal legs of a pair of angle irons 12 and 14, the vertical legs of which are welded or otherwise fixed to the opposite faces of a plate 16 disposed in a vertical plane and elongated longitudinally to extend the full length of the table. Said plate is supported adjacent each end by rods 18 secured thereto and extending horizontally transversely therefrom, said rods being secured at their outer ends to standards 20 which are fixed at their lower ends to frame channels 4 and 6. The upper edge of plate 16 is disposed beneath the table surface defined by the horizontal legs of angle irons 12 and 14, whereby to form a central longitudinal groove 22 in the table, as best shown in Fig. 2.

Figure 17:
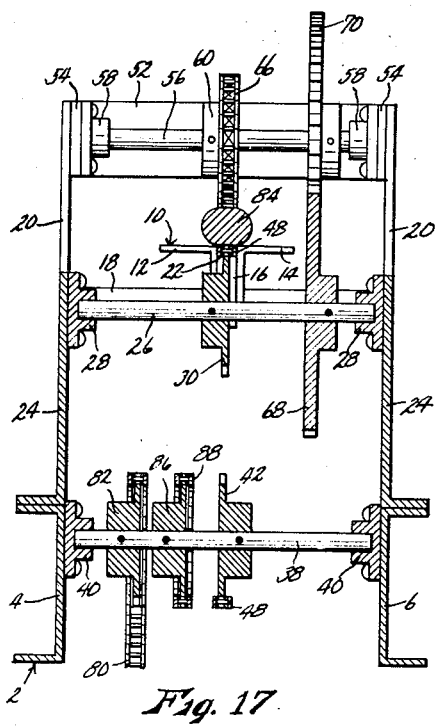
Fig. 17 is a fragmentary sectional view taken on line XVII—XVII of Fig. 7.

Immediately adjacent the right end of table 10, a pair of upright standards 24 are fixed at their lower ends respectively to frame channels 4 and 6. A shaft 26 extends between the upper ends of said standards transversely of the frame, being journalled rotatably in bearings 28 affixed to said standards (Fig. 17). A chain sprocket 30 is affixed to said shaft in the same vertical plane as table groove 22. Adjacent the left end of table 10, a sprocket 32 is similarly fixed to a shaft 34 carried rotatably between standards 36 fixed to the frame channels. Directly beneath shaft 26 and parallel thereto, a shaft 38 is journalled rotatably in bearings 40 fixed to the confronting faces of frame channels 4 and 6, and a sprocket 42 is fixed on said shaft in the vertical plane of sprocket 30. A shaft 44 is similarly disposed directly beneath and parallel to shaft 34, being rotatably carried between the frame channels and having a sprocket 46 fixed thereon. An endless chain 48 is trained respectively over sprocket 32, through table groove 22, and thence over sprockets 30, 42 and 46. Said chain is slightly thicker than the depth of groove 22, so as to project slightly above the surface of table 10.

A plate 50 is disposed above and in the same vertical plane as chain 48. Said plate is supported at each end by a yoke 52, the arms 54 of said yokes being welded or otherwise fixed to the upwardly extended ends of standards 20. At the right end of the plate, as viewed in Fig. 1, a shaft 56 extends between the upper ends of standards 20, being journalled in bearings 58 mounted on said standards, and a sprocket 60 is fixed thereon in the vertical plane of chain 48 and plate 50. A shaft 62 is similarly journalled between the ends of standards 20 at the left end of plate 50, and carries a sprocket 64. An endless chain 66 is trained about sprockets 60 and 64, the reaches of said chain intermediate said sprockets being supported by the upper and lower edges of plate 50. A spur gear 68 fixed on shaft 26 is meshed operatively with a spur gear 70 of equal size fixed on shaft 56. Chains 48 and 66 are driven by an electric motor 72 which drives a gear reduction unit 74 (Fig. 1), on the output shaft 76 of which is mounted a sprocket 78 which is operatively connected by chain 80 with a sprocket 82 fixed on shaft 38. Said motor functions to cause the upper reach of chain 48 and the lower reach of chain 66 to travel to the right, as viewed in Fig. 1. Since sprockets 42, 30 and 60 are of equal size, and since spur gears 68 and 70 are of equal size, chains 48 and 66 travel at all times at equal linear speeds. The confronting reaches of said chains are adapted to receive the rod-like member 84 therebetween, and are spaced apart a distance such that said rod-like member 84 is gripped clampingly therebetween, whereby member 84 is propelled to the right as viewed in Fig. 1, in a direction longitudinal to frame 2. It is to be understood that the mechanism so far described for propelling the member 84 may be a portion of a larger machine adapted to form or manufacture said member, where said member is of a composite or built-up structure, but insofar as the cut-off machine is concerned said mechanism is merely a means for propelling member 84, and with which the cutting members must be synchronized.

Fixed on shaft 38 is a third sprocket 86. An endless chain 88 is trained about said sprocket, and about a sprocket 90 fixed on a shaft 92 which is parallel to and spaced to the right from shaft 38, being journalled in bearings 94 fixed to the inner confronting faces of frame channels 4 and 6. Since sprocket 86 is equal in size to sprocket 42, it is evident that chain 88 will travel with a linear speed equal to that of chain 48, and hence equal to the speed of member 84.

Chain 88 is operable to drive cutter carriage 96, which is best shown in Figs. 1, 4 to 7, 11 and 12. Said carriage includes a front vertical wall 98 and a rear vertical wall 100. Each of said walls is secured at its lower edge as by screws 102 (Fig. 5) to a runner 104 extending longitudinally of frame 2, said runners being carried slidably in guides 106 and 108 fixed respectively to the inner confronting faces of frame channels 4 and 6 by means of screws 110. Walls 98 and 100 extend above frame 2, and are rigidly joined adjacent their upper edges by a horizontal plate 112 extending between said walls and secured thereto by screws 114. Said carriage is free to move slidably in a direction longitudinal to frame 2.

Extending between walls 98 and 100 and journalled therein is a shaft 116 which is transverse to the frame. A sprocket 118 is mounted for free rotation on said shaft. A pair of shafts 120 and 122 are disposed respectively on opposite sides of shaft 116 and parallel thereto, shaft 120 being journalled in walls 98 and 100, and shaft 122 being journalled in bearings 124 mounted on runners 104 immediately to the right of walls 98 and 100. A sprocket 126 is fixed on shaft 120, and a sprocket 128 is fixed on shaft 122, sprockets 126 and 128 being disposed in the vertical plane of sprocket 118 and chain 88. The upper reach of chain 88 is trained respectively over sprocket 126, under sprocket 118, and over sprocket 128, as best shown in Fig. 7. However, since all of sprockets 118, 126 and 128 normally turn freely, the movement of said chain does not normally cause carriage 96 to move.

Mounted on shaft 116, and either integral with or fixed to sprocket 118, is a toothed ratchet wheel 130 (Figs. 4, 5 and 11), said ratchet wheel being disposed adjacent front wall 98. Journalled in said front wall is an axle pin 132, said pin being parallel to shaft 116 and adjacent ratchet wheel 130. Fixed on said pin adjacent the inner side of wall 98 is a radially extending dog 134, said dog being toothed at its outer end and adapted by oscillatory movement of pin 132 to be moved into or out of engagement with ratchet wheel 130. Fixed on pin 132 adjacent the outer surface of wall 98 is a lever 136, best shown in Fig. 6, said lever being fixed intermediate its ends to said pin and extending to the left and right therefrom. A tension spring 138 engages at one end a pin 140 fixed in the left end portion of lever 136, and engages at its opposite end a pin 142 fixed in wall 98. Said spring urges said lever pivotally to move dog 134 into engagement with ratchet wheel 130. A bell-crank lever 144 is pivoted to wall 98 at 146 adjacent the left end of lever 136. Lever 144 is provided with a tooth 148 adapted to engage a mating tooth 150 formed in lever 136, whereby to hold the latter lever against the tension of spring 138, and thereby hold dog 134 out of engagement with ratchet wheel 130. A spring 152 engages at one end a pin 154 fixed in lever 144 and engages at its opposite end a pin 156 fixed in wall 98, whereby to urge lever 144 into engagement with lever 136.

Figure 13:
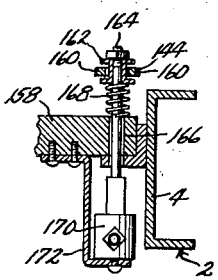
Fig. 13 is a fragmentary sectional view taken on line XIII—XIII of Fig. 4, with parts left in elevation.

A stop bar 158 extends transversely of frame 2 between the leftmost ends of guides 106 and 108 and is rigidly fixed thereto, said stop bar serving to engage the leftmost ends of runners 104 to limit the movement of carriage 96 to the left. Lever 144 extends to the left of its pivot 146, and is bifurcated at its left end to form arms 160 which are adapted, as the carriage moves to the left to engage stop bar 158, to move into engagement with a spool-shaped member 162 mounted on a vertical rod 164 carried vertically for sliding movement in a hole 166 formed therefor in stop bar 158 (see Figs. 4, 6 and 13). Said rod is normally urged upwardly by a compression spring 168 disposed about said rod, bearing at its lower end against bar 158 and at its upper end against spool member 162. The lower end of rod 164 is connected to the movable armature of a solenoid 170 mounted on bar 158 by means of bracket 172.

Thus whenever solenoid 170 is energized, rod 164 will be pulled downwardly, thereby pivoting lever 144 to release lever 136, allowing spring 138 to pivot the latter lever to move dog 134 into engagement with ratchet wheel 130. Said ratchet wheel and sprocket 118 are thereby locked against rotation. Chain 88, acting against sprocket 118, thence propels carriage 96 to the right, lever 144 thereby being moved out of engagement with spool member 162. As the carriage nears the right end of its travel, the bevelled right end of lever 136 is engaged and elevated by a roller 174 (Figs. 4 and 6) carried rotatably by a bracket 176 fixed to frame channel 4, moving dog 134 out of engagement with ratchet wheel 130 to arrest the movement of the carriage to the right. Also, as the right end of lever 136 is elevated by roller 174, tooth 150 of said lever is engaged by tooth 148 of lever 144 to secure lever 136 in its de-clutching position.

An electrical switch 178 is mounted on the outer surface of wall 98, and is provided with an operating lever 180 (Fig. 6) having at its free end a roller 182 resting against the upper edge of the right end portion of lever 136. Said switch is of the normally open type, being closed by lever 136 when said lever is held by lever 144 in its de-clutching position, and open when lever 136 is released by lever 144. Said switch is utilized in controlling the return movement of the carriage, as will be hereinafter described. Another electrical switch 184 (see Fig. 7) is carried by a bracket 186 fixed to frame channel 6. Said switch is provided with an operating lever 188 and roller 190 in the same manner as switch 178, the roller thereof being operably engaged by a finger 192 fixed to carriage wall 100, as said carriage moves to the left limit of its travel. Switch 184, however, is of the normally closed type, being open only when engaged by finger 192. Switch 184 is also useful in controlling the return stroke of the carriage.

The return stroke of carriage 96 is powered by a pneumatic cylinder 194 disposed horizontally in the midline of frame 2 to the right of shaft 92 and sprocket 90, and securely mounted in said frame by means of brackets 196. Said cylinder is provided with a piston 198 operatively connected to a piston rod 200, said piston rod extending to the left and being rigidly connected at its outer end to a cross bar 202 extending transversely between and rigidly connected to carriage runners 104. Air under pressure is supplied to the right end of the cylinder through a conduit 204 connected to a suitable source of air under pressure, and in which conduit is inserted an air valve 206, which is mounted in frame 2 by a suitable bracket 208. Said valve is shown diagrammatically in Fig. 3, and includes a movable plunger 210 normally urged by spring 212 to a position wherein cylinder 194 is vented to the atmosphere through port 214 and the air under pressure is cut off at port 216. Plunger 210 is provided with an operating rod 218 extending outwardly from the valve body, where it is engaged by one end of a lever 220 pivoted to the valve body at 222, the opposite end of said lever having pivotally secured thereto at 224 a rod 226 fixed at its opposite end to the movable armature of a solenoid 228 mounted in frame 2 by means of bracket 230. Thus when solenoid 228 is energized, it will operate through rod 226, lever 220, and rod 218 to move plunger 210 against spring 212, thereby closing atmospheric port 214 and opening pressure port 216 to furnish air to cylinder 194, and thus moving piston 198 and carriage 96 to the left.

A gear rack 232 is mounted in the midline of frame 2 within the span of movement of carriage 96, being mounted fixedly on cross bars 234 extending transversely between and fixed to carriage guides 106. Said rack meshes with a pinion 236 mounted for rotation on shaft 116, whereby movement of the carriage longitudinally of said frame will cause rotation of said pinion. Integral with or fixed to said pinion is a disc 238 concentric with shaft 116. A dog 240 (see Fig. 12) is pivoted eccentrically on said disc on a pin 242 parallel to shaft 116, said dog being adapted to engage a single-toothed ratchet wheel 244 mounted rotatably on shaft 116, being urged inwardly to engage said ratchet wheel by a spring 246 attached at its opposite ends to said dog and disc 238, respectively. Dog 240 is inclined so as to engage and rotate ratchet wheel 244 as carriage 96 moves to the right, but to ride inoperatively over said ratchet wheel as the carriage returns to the left.

Integral with or fixed to ratchet wheel 244 is a spur gear 248, which meshes with a spur gear 250 fixed on a shaft 252 disposed parallel to and above shaft 116 and journalled in carriage walls 98 and 100. Also fixed on shaft 252 is a bevel gear 254 meshing with a bevel gear 256 fixed on a vertical shaft 258 journalled centrally in horizontal plate 112. Gears 248 and 250 are of equal size, as are bevel gears 254 and 256. Fixed concentrically to the upper end of shaft 258, above plate 112, is a disc 260. A block 262 is mounted eccentrically in said plate for rotation about an axis parallel to but spaced apart from shaft 258. The upper surface of said block is grooved and slidably engages a bar 264 fixed to the lower surface of a horizontal plate 266, said bar extending longitudinally of frame 2. Plate 266 forms the base plate of a traversing carriage 268. Along the edges of said base plate transverse to frame 2, it is provided with ribs 270 (Fig. 7) which are engaged slidably in matching grooves formed in guides 272 fixed to the upper edges of carriage walls 98 and 100, and extending transversely to frame 2. Traversing carriage 268 is thus supported for horizontal sliding movement transverse to frame 2.

A horizontal, upwardly opening channel 274 is disposed above base plate 266, being rigidly attached to guides 272 by means of brackets 276. Said channel extends leftward from carriage 96 to a point adjacent sprocket 30 and is positioned to receive the member 84 as it emerges from between chains 48 and 66 of the propelling mechanism, and to support said member as it passes over the carriage longitudinally of frame 2.

Fixed on base plate 266 is a bearing standard 278 which carries for rotation a shaft 280 extending longitudinally of frame 2. On said shaft is mounted a circular cutting blade 282, said blade being disposed in a vertical plane transverse to member 84 and being normally disposed forwardly of the path of said member, as shown in Fig. 5. Said blade is also disposed just outwardly from the right end of channel 274, whereby as it moves transversely of frame 2 it will sever member 84 as it is supported by said channel. Blade 282 is rotatively driven at a high speed by an electric motor 284 mounted on base plate 266 by means of bracket 286. A sheave wheel 288 fixed on the drive shaft of said motor is operatively connected by means of belts 290 with a sheave wheel 292 fixed on shaft 280.

Figure 14:
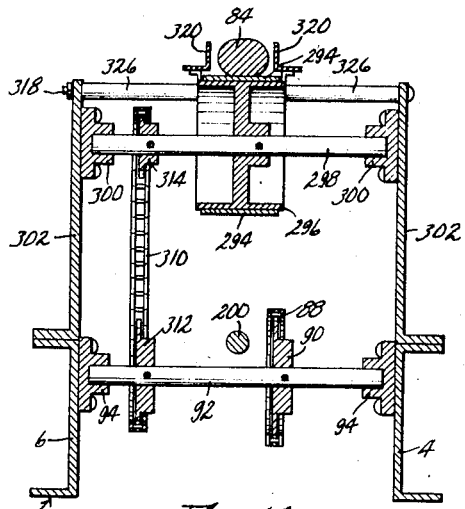
Fig. 14 is a sectional view taken on line XIV—XIV of Fig. 7.

As member 84 emerges to the right of carriage 96, it is received on the upper horizontal reach of an endless belt 294 which extends longitudinally of frame 2. Said belt is trained about a pulley 296 fixed on a horizontal shaft 298 journalled in bearings 300 (Fig. 14) mounted at the upper ends of a pair of standards 302 fixed at their lower ends to frame channels 4 and 6, respectively, and about a pulley 304 spaced at any desired distance to the right of pulley 296 and similarly supported by a shaft 306 journalled between the upper ends of standards 308 fixed to the frame channels, as indicated in Fig. 1. Said belt is driven from shaft 92 by means of a chain 310, which operatively engages a sprocket 312 fixed on shaft 92, and a sprocket 314 fixed on shaft 298 (see Fig. 14), so as to drive the upper reach of said belt to the right. It will be noted, however, that sprocket 314 is smaller than sprocket 312, so as to drive belt 294 at a linear speed greater than the normal speed of member 84 produced by propelling chains 48 and 66, for a purpose hereinafter appearing.

Figure 15:
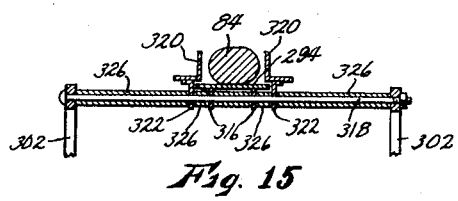
Fig. 15 is a fragmentary sectional view taken on line XV—XV of Fig. 7.
Figure 16:
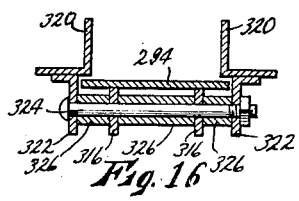
Fig. 16 is an enlarged sectional view taken on line XVI—XVI of Fig. 7.

The upper reach of belt 294 is supported on the upper edges of a pair of bars 316 extending longitudinally thereof, said bars being supported at their ends by bolts 318 extending transversely of frame 2 and engaging respectively in standards 302 and 308. Member 84 is prevented from moving laterally off of belt 294 by a pair of angle irons 320 extending longitudinally of said belt above the upper surface thereof. The upright legs of said angle irons form side walls spaced inwardly from the edges of said belt, and the outwardly extending legs of said angle irons extend outwardly beyond the edges of the belt. Welded or otherwise fixed to the outwardly extended portions of said horizontal legs are a series of downwardly extending clips 322 (see Figs. 15 and 16). The endmost of said clips are perforated to receive bolts 318, and the intermediate clips are perforated to receive bolts 324 which also extend through bars 316 (see Fig. 16). Bars 316 and clips 322 are maintained in properly spaced relation on bolts 318 and 324 by spacer sleeves 326 mounted on said bolts.

A trip carriage 328 is carried for sliding movement along one of angle irons 320, and is best shown in Figs. 1 and 7 to 10. The frame of said carriage constitutes a plate 330 disposed in a vertical plane longitudinal to frame 2 and provided at its lower edge with a suitable angled guide section 332 (see Fig. 8) in sliding engagement with one of angle irons 320, whereby said frame is adjustable along said angle iron, said frame being fixable at any desired point on the angle iron by a clamp screw 334 threaded in guide 332 and engaging a pressure plate 336 bearing against the horizontal leg of angle iron 320. An axle pin 338 is journalled in the upper left corner portion of plate 330, extending transversely through said plate and being rotatably supported in a bearing sleeve 340 fixed to said plate. A lever 342 is rigidly attached to said axle pin at the inner side of plate 330, said lever normally hanging downwardly between angle irons 320 to a point just above belt 294, as shown in Fig. 8 and in solid lines in Fig. 9. Said lever is provided with a semi-cylindrical face plate 344 at its lower end, facing to the left. Said face plate is engaged by member 84 as it moves along belt 294, thereby pivoting lever 342 to the position shown in dotted lines in Fig. 9. In order to prevent member 84 from rising above belt 294 and thereby contacting lever 342 at a higher point, which could occur through warping or bending of member 84, and which would disturb the gauging of the length of the sections being cut from member 84 hereinafter described, a second lever 346 is fixed to axle pin 338 adjacent lever 342. Said lever is provided with a curved foot plate 348 concentric with axle pin 338. Said foot plate extends forwardly of lever 342, and is spaced above belt 294 a distance substantially equal to the thickness of member 84, whereby to hold said member substantially against the belt as it engages lever 342, as indicated in Fig. 9.

Fixed to the opposite end of axle pin 338, at the outer side of plate 330, is a lever 350. A pawl 352 is pivoted freely at one end to the free end of lever 350, as by pin 354 (Fig. 7), the free end of said pawl resting against the toothed periphery of a ratchet wheel 356 mounted on an axle bolt 358 journalled in plate 330, whereby as lever 342 is engaged and pivoted by member 84, pawl 352 will turn ratchet wheel 356. An electric switch 360 is mounted on the outer surface of plate 330, said switch being normally open and provided in the same manner as switches 178 and 184 with an operating lever 362 (Fig. 7) having at its free end a roller 364 urged against the periphery of ratchet wheel 356, and spring loaded thereagainst to rest between two successive teeth thereof to act as a yieldable detent holding said ratchet wheel against rotation. Thus when said ratchet wheel is turned by pawl 352 as previously described, one tooth of said ratchet will pass over roller 364, moving the same to close switch 360 momentarily. In order to insure that under no condition can the ratchet wheel advance more than one tooth for each operation of lever 342 and pawl 352, the pawl is provided with a cam surface 366 which engages a pin 368 fixed in plate 330, whereby said pawl is elevated out of engagement with the ratchet wheel after said ratchet wheel has turned one tooth. A stop screw 370 is carried by plate 330, said screw being operable to engage lever 350 as it completes its back swing, thereby eliminating any possibility that free swinging of lever 342 to the left of vertical might cause pawl 352 to be retracted over more than one tooth of the ratchet wheel.

Referring now to the diagram in Fig. 3, it will be noted that electric line wires 372 and 374 are connected directly to motor 72 by wires 376 and 378, and to motor 284 by wires 380 and 382, whereby said motors run continuously so long as main control switch 384 is closed. Current flows from line wire 374 through wire 386, switch 360, wire 388, solenoids 170, and wire 390 to line wire 372, whereby said solenoid will be energized whenever switch 360 is closed. Current also flows from wire 374 through switch 184, wire 392, switch 178, wire 394 and solenoid 228 to line wire 372, whereby solenoid 228 is energized only when both of switches 178 and 184 are closed. The wires to switch 360, which is carried by trip carriage 328, are enclosed in a trailing cable 396 whereby to permit adjustable movement of said carriage. The wires to switch 178 on carriage 96 are similarly carried in a trailing cable 398 (Fig. 5).

The operation of the machine is substantially as follows: At rest carriage 96 rests at the left end of its travel, runners 104 thereof resting against stop bar 158 as shown in the drawings. When propelling chains 48 and 66 are set in motion by motor 72 as previously described, the rod-like member 84 positioned between the confronting reaches of said chains is advanced to the right as previously described, entering into and passing slidably through channel 274 and thence onto the upper reach of belt 294. There will be slippage between said belt and member 84, since the belt is being driven at a greater speed than member 84, and member 84 is held positively between the chains 48 and 66. When the foremost end of member 84 reaches trip carriage 328 and engages lever 342 thereof, pivoting said lever to cause pawl 352 to engage and turn ratchet wheel 356 to close switch 360 momentarily, solenoid 170 is energized and operates through rod 164 and spool-shaped member 162 to trip lever 144 to release lever 136. Lever 136 is then pivoted by spring 138 to move clutch dog 134 into engagement with ratchet wheel 130. This locks the ratchet wheel against rotation, whereupon chain 88 carries carriage 96 to the right at precisely the same speed as member 84, as previously described. The pivotal movement of lever 136 also opens switch 178.

Carriage 96 is free to move to the right since pneumatic cylinder 194 is at that time vented to the atmosphere through port 214 of valve 206. As carriage 96 begins its movement, finger 192 attached to the carriage moves out of engagement with switch 184, allowing said switch to close. This does not, however, energize solenoid 228, since switch 184 is connected in series with switch 178 in the electrical circuit of solenoid 228, and switch 178 is open at this time as described above.

As carriage 96 moves to the right in synchronization with member 84, rack 232 operates through pinion 236, disc 238, dog 240, ratchet wheel 244, gears 248 and 250, shaft 252, gears 254 and 256, shaft 258, disc 260, block 262, and bar 264 to move traversing carriage 268 transversely to frame 2, causing it to first travel rearwardly, during which stroke blade 282 traverses and severs member 84, and then to return forwardly to its original position. The length of travel of carriage 96 is so determined that pinion 236 engaging rack 232 turns through one revolution, whereby to move traversing carriage 268 through one complete cycle.

As carriage 96 moves to the right end of its travel, the right end of lever 136 is engaged and elevated by roller 174 mounted on the frame, and secured in this position by lever 144, which is urged into engagement with lever 136 by spring 152. The movement of lever 136 elevates clutch dog 134 out of engagement with ratchet wheel 130, thereby arresting the rightward movement of carriage 96. The movement of lever 136 also closes switch 178. Switches 178 and 184 then both being closed, it will be seen by reference to Fig. 3 that solenoid 228 is then energized, thereby operating valve 206 to supply air under pressure to cylinder 194. Said cylinder operates to return carriage 96 to the left. During said return stroke, traversing carriage 268 is not operated, since dog 240 (Fig. 12) rides inoperatively over single-toothed ratchet wheel 244. As carriage 96 nears the left end of its travel, finger 192 engages and opens switch 184, thereby interrupting the circuit to solenoid 228 and closing valve 206. Although this may occur slightly before carriage runners 104 engage stop bar 158, the carriage will either coast to the end of its stroke, or be carried therethrough by residual air pressure in cylinder 194.

The cycle of operation just described will be repeated continuously each time lever 342 of trip carriage 328 is pivoted. It is obvious that the length of the sections severed from member 84 may be varied at will by moving the trip carriage adjustably along angle iron 320. It will be noted also that each severed section, as soon as it is separated from the body portion of member 84, will immediately start to travel at an increased speed, since it is then supported on belt 294 and said belt, as previously described, is moving at a higher speed than the body portion of member 84. This action provides that, at trip carriage 328, there will always be a separation or space between the trailing end of the section last severed from member 84 and the leading end of the body portion of member 84. This space allows lever 342 to swing back down into the path of member 84 to reset the ratchet and pawl mechanism operating switch 360. This spacing also provides a time delay between the discharge of successive severed sections of member 84 from the right end of the upper reach of belt 294, which gives an operator time to handle said sections for packing or other subsequent operations. Although forming no essential part of the present invention, it is apparent also that the severed sections could be deflected laterally off of belt 294 for reception in coextensive relation on suitable handling tables.

It is apparent that while I have shown and described a specific embodiment of my invention, many modifications of structure and operation could be made within the spirit of the invention as defined by the scope of the appended claims.

What I claim as new and desire to secure by Letters Patent is:

1. A cut-off machine adapted to sever a continuous rod-like member into lengths, said machine comprising a frame, propelling means carried by said frame and operable to grip and propel said rod-like member longitudinally, a carriage carried by said frame for reciprocal movement longitudinal to said rod-like member, a chain carried operably by said frame and driven by said propelling means at a linear speed equal to and in the same direction as that of said rod-like member, a normally idling sprocket carried for rotation by said carriage and meshing with said chain, a clutch carried by said carriage and operable when engaged to secure said sprocket against rotation, a trip member carried by said frame and movable by the advancing end of said rod-like member, means carried by said frame and operable by the movement of said trip member to engage said clutch, whereby said carriage is advanced in the direction of movement of said rod-like member, cutting means carried by said carriage and operable when the carriage is advancing to sever said rod-like member, means carried by said frame and operable when actuated to return said carriage in a direction opposite to the travel of said rod-like member, and means carried by said frame and operable as said carriage reaches the end of its advancing movement to disengage said clutch and actuate said carriage returning means.

2. A cut-off machine adapted to sever a continuous rod-like member into lengths, said machine comprising a frame, propelling means carried by said frame and operable to grip and propel said rod-like member longitudinally, a carriage carried by said frame for reciprocal movement longitudinal to said rod-like member, a chain carried operably by said frame and driven by said rod-like member propelling means at a linear speed equal to and in the same direction as that of said rod-like member, a normally idling sprocket carried for rotation by said carriage and meshing with said chain, a clutch carried by said carriage and operable when engaged to secure said sprocket against rotation, a trip member carried by said frame and movable by the advancing end of said rod-like member, means carried by said frame and operable by the movement of said trip member to engage said clutch, whereby said carriage is advanced in the direction of movement of said rod-like member, cutting means carried by said carriage and operable during the advancing movement of said carriage to sever said rod-like member, a fluid cylinder carried by said frame and operably connected to said carriage, and to a source of fluid under pressure, whereby when fluid is supplied to said cylinder said carriage will be returned in a direction opposite to the travel of said rod-like member, a normally closed valve controlling the supply of fluid to said cylinder, and means carried by said frame and operable as said carriage reaches the end of its advancing movement to disengage said clutch and open said valve.

3. A cut-off machine adapted to sever a continuous rod-like member into lengths, said machine comprising a frame, propelling means carried by said frame and operable to grip and propel said rod-like member longitudinally, a carriage carried by said frame for reciprocal movement longitudinal to said rod-like member, a chain carried operably by said frame and driven by said propelling means at a linear speed equal to and in the same direction as that of said rod-like member, a normally idling sprocket carried for rotation by said carriage and meshing with said chain, a clutch carried by said carriage and operable when engaged to secure said sprocket against rotation, a trip member carried by said frame and movable by the advancing end of said rod-like member, means carried by said frame and operable by the movement of said trip member to engage said clutch, whereby said carriage is advanced in the direction of movement of said rod-like member, cutting means carried by said carriage and operable during the advancing movement of said carriage to sever said rod-like member, a fluid cylinder carried by said frame and operably connected to said carriage and to a source of fluid under pressure, whereby when fluid is supplied to said cylinder said carriage will be returned in a direction opposite to the travel of said rod-like member, a normally closed valve controlling the supply of fluid to said cylinder, means carried by said frame and operable as said carriage reaches the end of its advancing movement to disengage said clutch and open said valve, and means carried by said frame and operable as said carriage reaches the end of its return stroke to close said valve.

4. A cut-off machine adapted to sever a continuous rod-like member into lengths, said machine comprising a frame, propelling means carried by said frame and operable to grip and propel said rod-like member longitudinally, a carriage carried by said frame for reciprocal movement longitudinal to said rod-like member, said carriage having a normal position from which it is adapted to be advanced in the direction of travel of said rod-like member, a chain carried operably by said frame and driven by said propelling means at a linear speed equal to and in the same direction as that of said rod-like member, a normally idling sprocket carried for rotation by said carriage and meshing with said chain, a clutch carried by said carriage and operable when engaged to secure said sprocket against rotation, whereby said carriage is caused to advance in the direction of travel of said rod-like member, cutting means carried by said carriage and operable during the advancing movement of said carriage to sever said rod-like member, a trip carriage carried by said frame for adjustment in the direction of travel of said rod-like member, a lever carried pivotally by said trip carriage and movable by the advancing end of said rod-like member, a first electric switch carried by said trip carriage and adapted to be closed momentarily at each operation of said lever, a clutch operating lever pivoted to said carriage and resiliently urged to a position wherein said clutch is engaged, a latch lever pivoted to said carriage and resiliently urged into engagement with said clutch lever to secure the same in a clutch disengaging position, electrically operated means carried by said frame and operable by an electric circuit including said first switch to operate said latch lever to release said clutch lever, whereby said clutch is caused to engage and said carriage is advanced by said chain, a fluid cylinder carried by said frame and operably connected to said carriage and to a source of fluid under pressure, whereby to return said carriage in a direction opposite to the travel of said rod-like member, a valve operable to control the supply of fluid to said cylinder, a second electric switch carried by said carriage and engaged by said clutch lever to be closed when said clutch is disengaged and open when said clutch is engaged, a third electric switch carried by said frame, a switch operating member carried by said carriage and adapted to engage and open said third switch only when said carriage is at or adjacent its normal position, electric means for opening said valve including a circuit having said second and third switch disposed in series therein, and means carried by said frame and operable to engage and pivot said clutch lever to its clutch-disengaging position as said carriage reaches the end of its advancing stroke.

5. A cut-off machine adapted to sever a continuous rod-like member into lengths, said machine comprising a frame, propelling means carried by said frame and operable to propel said member longitudinally, a main carriage carried by said frame for reciprocal movement longitudinally of said member, carriage propelling means carried by said frame and operable when actuated to advance said carriage in the direction of movement of said member in synchronization therewith and then return said carriage in the opposite direction, a traversing carriage carried by said main carriage for reciprocal movement transverse to said member, a cutting element carried by said traversing carriage and normally disposed at one side of said rod-like member, a gear rack fixed in the frame, a pinion carried for rotation by the main carriage and meshing with said rack, an operative connection between said pinion and said traversing carriage, whereby as said main carriage advances said rack and pinion will cooperate to drive said traversing carriage to traverse said rod-like member, whereby said rod-like member is severed by said cutting element, a trip carriage carried by said frame and including a movable trip disposed in the path of said rod-like member after it has passed said carriages, said trip being movable by the advancing end of said rod-like member, and means operable by the movement of said trip to actuate said main carriage propelling means.

6. The structure as recited in claim 5 wherein said operative connection between said pinion and said traversing carriage includes a ratchet and dog drive operative in one direction only, whereby said traversing carriage will not be reciprocating during the return movement of said main carriage.

References Cited in the file of this patent
UNITED STATES PATENTS

| | | |
|---|---|---|
| 556,857 | Madden | Mar. 24, 1896 |
| 1,077,923 | Witham et al. | Nov. 4, 1913 |
| 1,930,295 | Von Henke | Oct. 10, 1933 |
| 1,946,926 | Barton | Feb. 13, 1934 |
| 2,209,995 | Morris | Aug. 6, 1940 |
| 2,278,786 | Johnston | Apr. 7, 1942 |
| 2,287,833 | Ridgway | June 30, 1942 |